(12) United States Patent
Holmes et al.

(10) Patent No.: US 11,673,349 B2
(45) Date of Patent: Jun. 13, 2023

(54) RF WELDER TUNING SYSTEM AND PROCESS

(71) Applicant: R+D Custom Automation, Inc., Lake Villa, IL (US)

(72) Inventors: Eric S. Holmes, Kansasville, WI (US); Loren W. Esch, Burlington, WI (US)

(73) Assignee: R+D Custom Automation, LLC, Trevor, WI (US)

( * ) Notice: Subject to any disclaimer, the term of this patent is extended or adjusted under 35 U.S.C. 154(b) by 320 days.

(21) Appl. No.: 16/703,551

(22) Filed: Dec. 4, 2019

(65) Prior Publication Data

US 2020/0223155 A1    Jul. 16, 2020

Related U.S. Application Data

(60) Provisional application No. 62/846,846, filed on May 13, 2019, provisional application No. 62/792,115, filed on Jan. 14, 2019.

(51) Int. Cl.
*B29C 65/00* (2006.01)
*B29C 65/04* (2006.01)

(52) U.S. Cl.
CPC .......... *B29C 66/9592* (2013.01); *B29C 65/04* (2013.01); *B29C 66/961* (2013.01)

(58) Field of Classification Search
CPC .... B29C 65/04; B29C 66/9592; B29C 66/961
See application file for complete search history.

(56) References Cited

U.S. PATENT DOCUMENTS

| | | |
|---|---|---|
| 5,254,825 A | 10/1993 | Schippers |
| 5,278,382 A | 1/1994 | Rische et al. |
| 5,427,645 A | 6/1995 | Lovin |
| 5,833,915 A | 11/1998 | Shah |
| 6,009,925 A | 1/2000 | Hall et al. |
| 6,617,557 B1 | 9/2003 | Ryan et al. |
| 6,858,083 B2 | 2/2005 | Sterud et al. |
| 7,012,232 B1 | 3/2006 | Gruenspecht et al. |

(Continued)

FOREIGN PATENT DOCUMENTS

JP    2007015122 A  *  1/2007

OTHER PUBLICATIONS

Translation of JP 2007015122 A, Inventor Akiyoshi Tsuji, Tsuneo Nagata, Taiji Yamamoto, Jan. 25, 2007 (Year: 2007).*

(Continued)

*Primary Examiner* — George R Koch
(74) *Attorney, Agent, or Firm* — Boyle Fredrickson S.C.

(57) ABSTRACT

Applied power as a function of time is ramped up at the onset of an RF welding process in a manner that is predetermined to match source and load impedance as reflected by maximized forward power during at least the majority of the welding process. The ramp-up portion takes the form of a non-linear curve, such as an S-shaped curve, as opposed to one or more discrete steps. The applied power may then be maintained at or near that maximum required value at least a majority of the remainder of the heating portion of the welding process. The shape of the non-linear ramp-up portion of the applied power curve may be predetermined using, for example, virtual motor control using applied power as a virtual axis.

1 Claim, 3 Drawing Sheets

(56) References Cited

U.S. PATENT DOCUMENTS

| | | |
|---|---|---|
| 7,220,950 B2 | 5/2007 | Gruenspecht et al. |
| 7,586,071 B2 | 9/2009 | Gruenspecht et al. |
| 7,964,829 B2 | 6/2011 | Vess |
| 8,151,851 B2 | 4/2012 | Vess |
| 8,502,121 B2 | 8/2013 | Vess |
| 8,573,274 B2 | 11/2013 | Vess |
| 8,574,390 B2 | 11/2013 | Vess |
| 2007/0045240 A1 | 3/2007 | Smith et al. |
| 2009/0095402 A1 | 4/2009 | Hall et al. |
| 2013/0105556 A1* | 5/2013 | Abell .................. B23K 20/10 228/1.1 |
| 2018/0133977 A1 | 5/2018 | Luan Dos Santos Pereira et al. |

OTHER PUBLICATIONS

"Motion Control in the ControlLogix 5550 System"; Allen-Bradley Hands on Motion lab workbook; Jan. 2000; 74 pages; Rockwell Automation Publication HOM_ADV Logix.

* cited by examiner

RF WELDER TUNING SYSTEM AND PROCESS

CROSS-REFERENCE TO A RELATED APPLICATION

This application claims priority under 35 U.S.C. § 119(e) to prior provisional U.S. Patent Application Nos. 62/792,115, filed Jan. 14, 2019 and 62/846,846, filed May 13, 2019, both entitled RF Welder Tuning System and Process, the contents of each of which, including the Appendix thereto, are hereby incorporated by reference in their entirety.

BACKGROUND OF THE INVENTION

1. Field of the Invention

The invention relates to radio frequency (RF) welders and, more particularly, relates to a system and process for tuning a RF welder.

2. Discussion of the Related Art

RF welders, also known as "dielectric welders" and "high frequency welders", are well-known for thermally-bonding mating perimeter edges of products made from dipole plastic, most notably products made from PVC. Medical IV bags are a common example. The typical RF welder is characterized by a die press having upper and lower platens which support a "load" in the form of mating sheets of the product material. The top platen and a bottom platen act as electrodes for transferring electrical energy through the load and the die. A die is attached to the top platen and acts as an electrode in tandem with the top platen. The die has conductive electrical characteristics which alter the load characteristics. The load acts a dielectric, absorbing energy passed between the top and bottom platens. The platens are moved toward one another by one or more cylinders as the material melts, welding the sheets together.

During RF welding, it is important to match the impedance of the load with that of the power source. Maximum power transfer and, thus, maximum efficiency, occur when the magnitude of the load impedance is equal to the magnitude of the source impedance. However, radio frequency dielectric heating is a dynamic process. During the welding cycle, the temperature of the dielectric material changes while the "die gap" or the distance between the upper and lower platens decreases. The load absorbs more heat and electrical power as the die gap decreases, changing the load's impedance.

Due to the dynamic nature of the welding process, RF welders need to be "tuned" to maintain impedance matching and resulting heating efficiency. Tuning can be characterized by maximizing the percentage of "forward power" applied to the die gap and the load contained therein as opposed to "reflected power" reflected from the die or otherwise not applied to the die gap. An ideal, perfectly-turned system has 100% forward power and 0% reflected power at all times. Poorly-tuned systems are slower and less effective than well-tuned system. The amount of reflected energy is influenced by the seriousness of the mismatch between source and load impedance. The two worst-case scenarios are an open circuit and a short circuit, corresponding to infinite load impedance and zero load impedance, respectively. These two cases represent a complete discontinuity; no energy can be absorbed, and consequently, all of the energy is reflected. Tuning historically took the form of stepping up power during the welding process as opposed to applying full power throughout the process. This tuning was inexact, at best.

More recently, "solid-state" welders have been introduced that use variable capacitor(s) to tune the system. In this type of system, one or more variable capacitors are driven with a small motor under feedback of measured forward and reflected power to alter the impedance of the die in an attempt to match the source impedance with that of the load and keep the welder in tune as the die gap decreases. Unfortunately, at high weld speeds, the capacitor(s) of the typical solid-state welder are incapable of keeping up with rapid fluctuations in system characteristics. The welder goes out of tune for at least some periods of time, lengthening the welding process.

This problem can be alleviated, but not eliminated, by providing power supply stepping as a form of supplemental tuning. That is, power initially is supplied at a predetermined percentage of full power and is then stepped up to full power at a designated point of time in the weld cycle. This stepping reduces the rate of load impedance change and, thus, facilitates sufficiently rapid source impedance alteration to maintain an impedance match. However, because the power stepping is not tailored to meet the needs of a particular system and particular operating parameters, including the load which varies with product characteristics, the supplemental tuning has only limited effectiveness.

The need therefore exists to improve tuning of an RF welder.

SUMMARY OF THE INVENTION

In accordance with the invention, the above-identified need is met by ramping up applied power during an RF welding process in a manner that is predetermined to match source and load impedance as reflected by maximized forward power during at least the majority of the welding process. The applied power as a function of time may be increased in a non-linear curve as opposed to all at once or in one or more discrete steps.

In one configuration, impedance matching is maintained sufficiently to maintain the percentage of forward power above 50%, and more typically above 75%, of the maximum power. This power supply is maintained for more than the majority, and more typically for more than 75%, of the welding process.

In one configuration, the ramp-up portion of the applied power curve is generally S-shaped, starting at zero and ending at or near a maximum required value, i.e, the optimal power level for the application at-hand. The S-shaped curve may have a relatively short first end section of relatively high positive slope, a relatively long intermediate section of varying slope, transitioning from positive to negative slopes at an intermediate segment of that center portion, and a short second end section having a relatively high negative slope. The applied power then may be maintained at or near that maximum required value for at least a majority of the remainder of the heating portion of the welding process.

One possible technique for determining the shape and duration of the applied power curve is to create a "virtual axis" in a "virtual motor control" system. In this case, the desired output of the controlled device vs. time is plotted on a "virtual axis", and inputs are mapped to achieve the desired output.

Also disclosed is a method of tuning an RF welder during a welding process by the non-linear ramping of the welder's applied power.

These and other aspects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof. It is hereby disclosed that the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION

Figure 1:
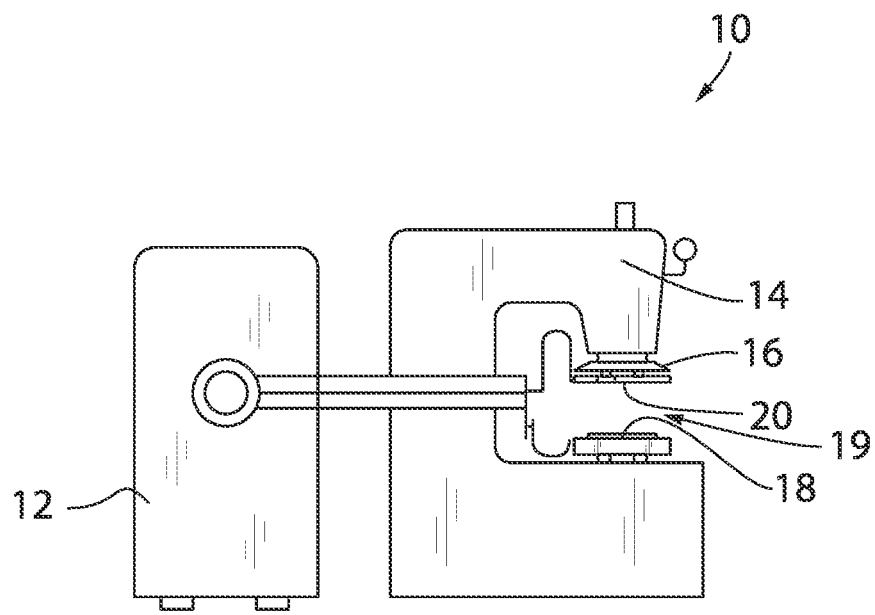
FIG. 1 schematically illustrates a RF welder equipped with a tuning system and process in accordance with the present invention.
Figure 2:
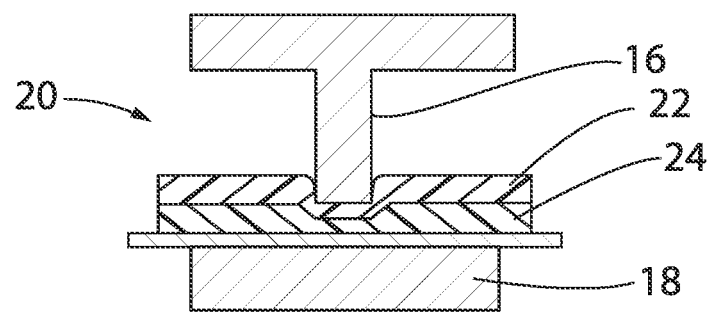
FIG. 2 schematically illustrates a die press of the RF welder of FIG. 1.
Figure 3:
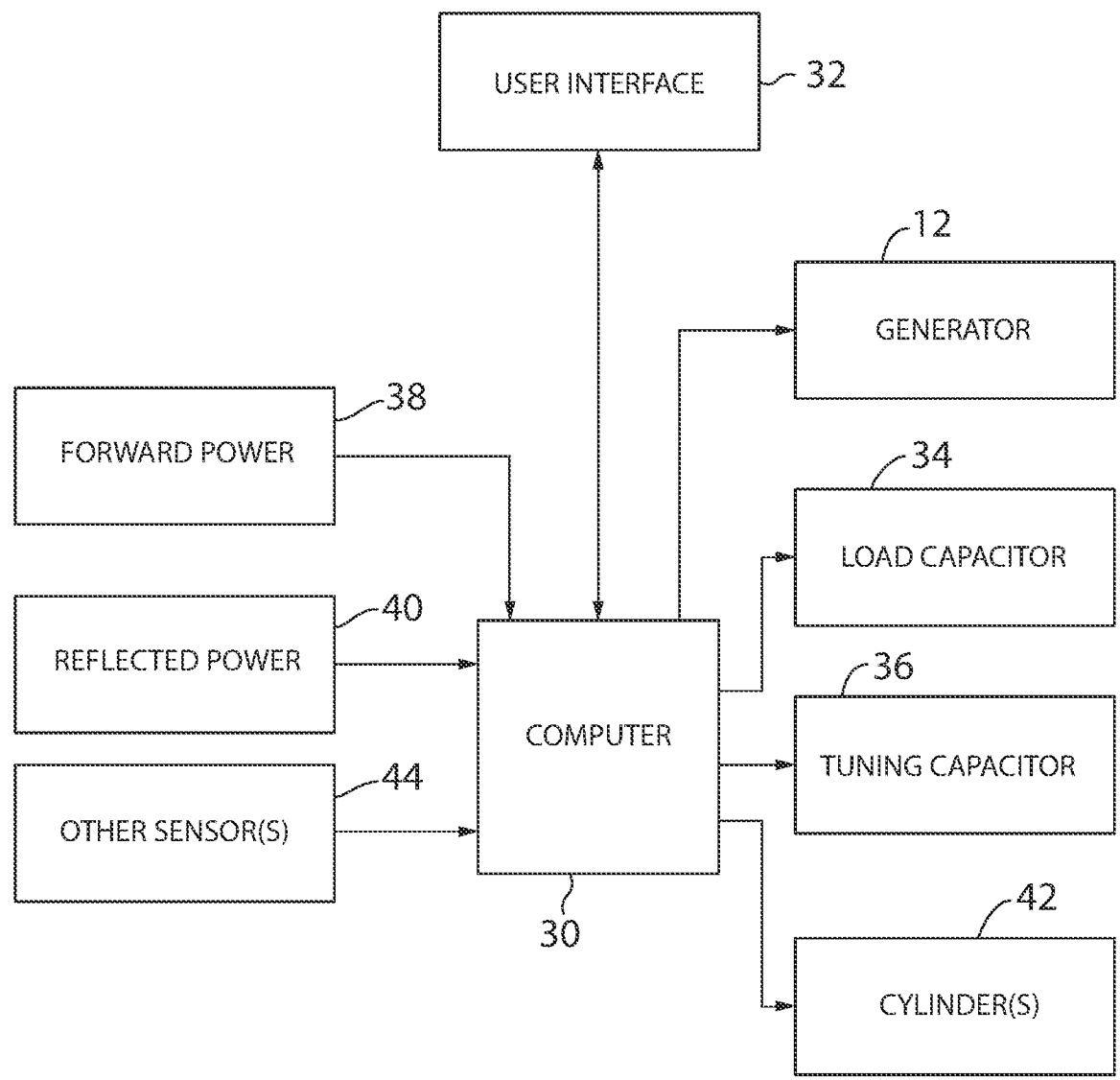
FIG. 3 schematically illustrates a control system of the RF welder of FIG. 1.

FIGS. 1 and 2 schematically depict a solid-state RF welder 10 constructed in accordance with the present invention. The welder 10 includes a high frequency generator 12 and a die press 14. Die press 14 has first and second (typically upper and lower) platens 16 and 18 that are spaced from one another by a die gap 19 and that are movable relative to one another to alter the thickness of the die gap 19. A die 20 is attached to the top platen 16 and acts as an electrode in tandem with the top platen 16. The die gap 19 receives a "load" in the form of two or more sheets 22 and 24 to be welded together as best seen in FIG. 2. The sheets may be formed of PVC or another dielectric material. The sheets 22 and 24 may, for example, be configured to form opposed sides of a medical IV bag. An optional buffer layer (not shown) may also be provided in the die gap 19 between bottom sheet 24 and lower platen 18 in order to prevent arcs across platen 18 and die 20. The electrical energy supplied by the generator 12, or "applied power", can be varied under control of a programmable computer 30 (FIG. 3). When electrical energy is supplied to the die 20 from the generator 12, both the top platen 16 and the bottom platen 18 act as electrodes for transferring electrical energy through the load and the die 20. The load formed by the sheets 22 and 24 acts as a dielectric, absorbing energy passed between the top and bottom platens 16 and 18 and heating the load as a result.

A control system for the RF welder 10 is illustrated schematically in FIG. 3. That system includes a computer 30 that may be in two-way communication with a user interface 32 and/or that may have a user interface 32. The computer 30 may comprise a single electronic controller or two or more such controllers coupled to suitable sensors, inputs, displays, etc. by wired or wireless connections. The user interface 32 incorporates features, such as a monitor or touch screen, to display information, and also includes one or more user input devices, such as a touch screen, a keyboard, or a mouse. Power supplied from the generator 12 to the die 20 can be regulated by a load capacitor 34 and a tuning capacitor 36. The impedance of both capacitors 34 and 36 can be varied under control of the computer 30 under feedback from sensors 38 and 40 monitoring forward power and reflected power, respectively. Pressure applied to the cylinder(s) 42 that operate the press 14 also is regulated by the computer 30. Other sensor(s) 44 may be provided that monitor, for example, the state of the generator 14 and/or the state of the cylinder(s) 42.

In operation, the generator 12 applies a RF current to the die 20 while the load (sheets 22 and 24) is clamped between the upper platen 16 and the lower platen 18 at a pressure that is settable using the computer 30 and the user interface 32. The applied RF current heats the sheets 22 and 24 until they melt. As the sheets 22 and 24 melt, the upper platen 16 moves toward the lower platen 18, decreasing the die gap thickness and maintaining pressure on the sheets 22 and 24 to weld the sheets together. As the die gap 19 decreases and the impedance of the load varies, the computer 30 tunes the welder 10 by adjusting the impedance of the load capacitor 34 and the tuning capacitor 36 under feedback from sensors 38 and 40 in an attempt to match the source impedance with the load impedance and, thus, to keep the welder 10 in tune as the die gap opening decreases. This impedance-based tuning may be performed in a manner that is standard for solid state RF welders.

Figure 4:
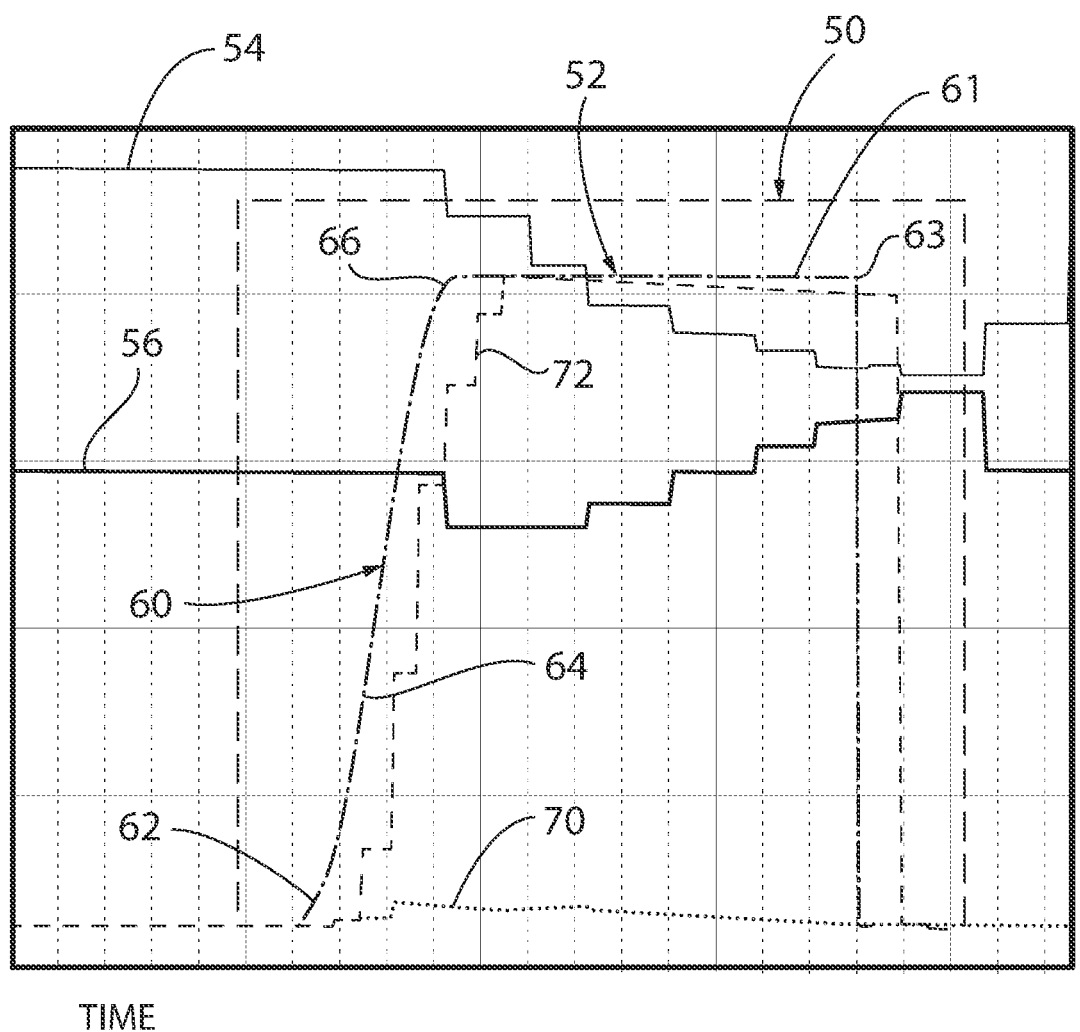
FIG. 4 is a series of curves plotting operation of aspects of the RF welder of FIG. 1 vs. time.

In accordance with an embodiment of the invention, the tuning capability of the solid-state RF welder 10 is improved by increasing applied power from the generator 14 in a non-linear manner that is predetermined to achieve optimal supplemental tuning for a given product (load) configuration. This increase is performed under control of the computer 30 in a pre-determined manner. An example of this applied power-based open-loop tuning technique is illustrated graphically in FIG. 4, the curves of which plot operation of key components of the RF welder 10 vs. time during a weld cycle. Curve 50 plots pressure (psi) as applied to the cylinder(s) 42. This pressure increases to a set value at or near the beginning of the weld cycle and remains at that pressure until the weld cycle is complete. Applied power as delivered by the generator 12 (watts or amps) is designated by curve 52. Impedance of the load capacitor 34 and tuning capacitor 36 (ohms) are designated by curves 54 and 56, respectively. A comparison of the latter portion of curves 50 and 52 reveals that power supply is terminated before pressure is relieved from the cylinder(s) 42. This lag assures that the sheets 22 and 24 remain pressed together as the melted dielectric material cools and hardens to weld the sheets 22 and 24 together. Curves 54 and 56 show that that capacitor control initiates sometime after heating commences and the die gap begins to decrease, and continues until power supply is terminated, as is standard for solid-state RF welders.

The applied power curve 52 has an initial or ramp-up portion 60 during which power is increased and a terminal portion 61 where power is maintained constant (typically at full power) until power supply is terminated entirely at the end 63 of the power supply cycle. The initial portion 60 of applied power curve 52 shows that applied power delivered by the generator 14 increases not all-at-once or in discrete steps but in a non-linear curve. Applying power to the load with a non-linear curve allows the system to follow the dynamic tuning requirements of a given system having a given load. Abrupt changes in requested power are eliminated, keeping the requirements of the match network within its capabilities and resulting in increased weld efficiency and lower power requirements.

In the illustrated embodiment, the non-linear curve is generally S-shaped, having a short first section 62 of relatively high positive slope, a long intermediate section 64 of varying slope transitioning from positive to negative slopes at a point of inflection, and a short second end section 66 having a relatively high negative slope. It has been discovered that ramping power in a non-linear curve rather than in discrete steps inhibits or prevents the RF welder 10 from going out of tune, as confirmed by the nearly non-existent reflected power curve 70 and the forward power curve 72, which essentially tracks the applied power curve 52. In fact, the percentage of forward power is maintained above 50%, and more typically above 75%, for the majority, and more typically for more than 75%, of the welding process. The slope of the various portions of the ramp-up portion 60 of the applied power curve 52 can be experimentally determined based on given welder and product configurations using the user interface 32 of FIG. 3 and stored in the computer 30. Hence, heating effectiveness is maximized.

A possible technique for determining the shape and duration of the non-linear ramp-up portion 60 of the applied power curve 52 is to create a "virtual axis" in a "virtual motor control" system. Virtual motor control systems are used in a variety of systems to control motors and other driven devices purely with software programming as opposed to mechanically through gears or cams. The desired output of the controlled device vs. time is plotted on a "virtual axis", and inputs are mapped to achieve the desired output. A virtual axis is an internally-generated position reference that has attributes of a servo-axis except for the fact that it lacks a feedback drive or a servo module. A virtual axis and its setup and exemplary uses are described in detail on pages 26-31 of "HANDS ON MOTION," Publication HOM_ADV Logix, January 2000, the contents of which are incorporated by reference herein as background subject matter that is non-essential to the present invention.

In the present case, the applied power is the "virtual axis." The designer manually increases applied power using monitored forward power and/or monitored reflected power as instantaneous feedback to maximize the rate of power increase while maintaining maximum forward power percentage and minimum reflected power percentage. Using this technique, the optimal applied power curve for a given system setup (i.e., a given welder and given product characteristics) can be mapped and recorded in only a few minutes. That recorded virtual motor control curve can thereafter reliably be used for all welding operations for the same product.

Many changes and modifications could be made to the invention without departing from the spirit thereof. For example, while the disclosed applied power based tuning techniques are described as being used in combination with or supplemental to capacitor-based tuning techniques, it is possible that they could be employed on a standalone basis. In addition, the non-linear ramp-up portion of the applied power curve need not be S-shaped.

What is claimed is:

1. An RF welder comprising:
  (A) a die press having first and second relatively movable platens defining a die gap therebetween that is configured to receive a load;
  (B) a high frequency generator that is configured to generate applied power; and
  (C) a computer that is in operable communication with the generator so as to control the generator to vary applied power as a function of time in an applied power curve that increases non-linearly over at least a portion of the applied power curve,
    wherein the non-linear portion of the applied power curve is predetermined and stored in the computer,
    wherein the non-linear portion of the applied power curve is determined using monitored forward power and/or monitored reflected power as feedback, and
  wherein the non-linear portion of the applied power curve is determined using virtual motor control using applied power as a virtual axis.

* * * * *